United States Patent Office 3,138,642
Patented June 23, 1964

3,138,642
PROCESS FOR THE PRODUCTION OF UNSATURATED ALCOHOLS FROM EPOXIDES
Werner Kirchhof, Walter Franke, and Walter Stumpf, all of Marl, Kreis Recklinghausen, Germany, assignors to Chemische Werke Huls Aktiengesellschaft, Marl, Kreis Recklinghausen, Germany, a corporation of Germany
No Drawing. Filed Feb. 29, 1960, Ser. No. 11,485
Claims priority, application Germany Mar. 16, 1959
3 Claims. (Cl. 260—617)

It is known that catalytic isomerization of propylene oxide forms allyl alcohol in addition to propyl aldehyde and acetone. The oxides of aluminum, titanium, thorium and chromium have been used as catalysts for said isomerization. Isomerization of propylene oxide at 250° C. with lithium phosphate as catalyst gives a relatively high yield of allyl alcohol but the yield at higher temperatures is very low.

Now we have found that by the use of aluminum organic compounds as catalysts 1,2-epoxides which contain at least one hydrogen on the carbon atom next to the epoxy group may be isomerized at low temperatures with very good conversion and good yields of alpha,beta-unsaturated alcohols.

The invention embraces the use of epoxides embraced by the general formula

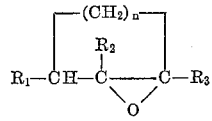

in which each of $R_1$ to $R_3$ stands for a member of the group consisting of hydrogen, and alkyl, aryl, aralkyl and cycloalkyl groups and $n$ is a whole number from 1 to 17, for example cyclohexene oxide, 1,2-epoxycyclododecane and 1,2-epoxycyclododecadiene-(5,9). These epoxides are obtainable by the process described in Belgian Patent No. 651,041 and German Patent No. 1,058,-987.

Suitable aluminum organic compounds are, for example, dialkyl-aluminium hydrides, especially diisobutyl-aluminium hydride. The aluminium organic compounds may be used as catalysts in quantities up to equimolar ratio to the epoxide.

The process suitably is carried out by introducing the aluminum organic compound or a solution thereof in an inert solvent such as benzene, xylene, octane or isopropylcyclohexane dropwise into the epoxide at a temperature of from 0 to 200° C., preferably from 100 to 150° C.

At the end of the reaction alpha,beta-unsaturated alcohol is recovered in the pure state in known manner e.g. by distillation. The yield of unsaturated alcohol by the process of the present invention is greater than in the previously known processes. The yields amount to 80% or more with conversions of 90% and more. The especial advantage of the present process is its ability to operate with epoxides which, due to their sensitivity or high boiling point, could not be used in the known processes. The unsaturated alcohols either as such or in the form of derivatives thereof are useful for the production of polymerizates or softening agents.

The invention is illustrated by the following specific examples.

Example 1

A solution of 90 parts by weight of diisobutyl-aluminum hydride in 150 parts by weight of xylene is added dropwise to a mixture of 100 parts by weight of epoxycyclododecadiene-(5,9) and 50 parts by weight of xylene with stirring at 120° C. and this temperature is maintained for 4 hours. Then the aluminum organic compound is destroyed by the introduction of 5% water solution of hydrochloric acid. The organic phase is then separated from the aqueous phase, dried and distilled. 81 parts by weight of 1-oxy-cyclododecatriene-(2,5,9) are distilled within the temperature range from 90 to 95° C. at 0.4 mm. Hg.

Example 2

A solution of 10 parts by weight of diisobutyl-aluminum hydride in 50 parts by weight of xylene was added dropwise to a solution of 100 parts by weight of epoxycyclododecadiene-(5,9) in 150 parts by weight of xylene, with stirring, at 120° C. The mixture was maintained at 120° C. for 6 hours and then further treated as described in Example 1. Distillation of the solvent left 98 parts by weight of a crude product which contained epoxycyclododecadiene and 1-oxycyclododecatriene-(2,5,9) in the ratio of 6 to 4.

Example 3

A solution of 90 parts by weight of diisobutyl-aluminum hydride (70%) in 100 parts by weight of xylene was added dropwise over a period of ½ hour to a mixture of 100 parts by weight of epoxycyclododecane and 100 parts by weight of xylene, with stirring, at 120° C. and the resulting mixture was maintained at 120° C. for 3 hours with stirring. The aluminum organic compound was then destroyed by the addition of a 10% water solution of hydrochloric acid. The reaction mixture was then extracted with ether, neutralized, dried and distilled. About 10% of the epoxycyclododecane was recovered unchanged. 70 parts by weight of 1-oxy-cyclododecene-(2) was recovered within the range from 84 to 91° C. at 0.3 Torr.

We claim:
1. Process for the production of an alpha,beta-unsaturated secondary ali- and monocarbocyclic alcohol which comprises heating a solution of a 1,2-epoxide of the general formula

in which R is an unbranched hydrocarbon chain containing from 1 to 17 carbon atoms with a dialkyl-aluminium hydride in an inert hydrocarbon at a temperature within the range from 0 to 200° C. and hydrolyzing the reaction products before recovery of the desired alcohol.

2. Process as defined in claim 1 in which the 1,2-epoxide is a member selected from the group consisting of cyclohexane oxide, 1,2-epoxycyclododecane and 1,2-epoxycyclododecadiene-(5,9).

3. Process as defined in claim 1 in which the dialkyl-aluminum hydride is diisobutyl-aluminum hydride.

References Cited in the file of this patent
UNITED STATES PATENTS 2,704,774     Gasson et al. _____ Mar. 22, 1955
3,024,287     Kennedy et al. _____ Mar. 6, 1962

OTHER REFERENCES
Ziegler et al.: Angew Chem., 67:424–26 (1956) (3 pages).